US009621655B2

(12) United States Patent
Briant

(10) Patent No.: US 9,621,655 B2
(45) Date of Patent: Apr. 11, 2017

(54) APPLICATION AND DEVICE TO MEMORIALIZE AND SHARE EVENTS GEOGRAPHICALLY

(71) Applicant: TILOTAG LLC, Cooper City, FL (US)

(72) Inventor: Raymond Halsey Briant, Cooper City, FL (US)

(73) Assignee: TILOTAG, LLC, Cooper City, FL (US)

( * ) Notice: Subject to any disclaimer, the term of this patent is extended or adjusted under 35 U.S.C. 154(b) by 0 days.

(21) Appl. No.: 15/162,186

(22) Filed: May 23, 2016

(65) Prior Publication Data

US 2016/0269485 A1    Sep. 15, 2016

Related U.S. Application Data

(63) Continuation of application No. 14/029,850, filed on Sep. 18, 2013, now Pat. No. 9,347,789.

(51) Int. Cl.
| | |
|---|---|
| *G01C 21/36* | (2006.01) |
| *G06F 3/048* | (2013.01) |
| *G06F 3/0481* | (2013.01) |
| *G06F 3/0484* | (2013.01) |
| *G06F 3/0482* | (2013.01) |
| *G06F 17/30* | (2006.01) |

(Continued)

(52) U.S. Cl.
CPC ........ *H04L 67/1097* (2013.01); *G01C 21/362* (2013.01); *G01C 21/3679* (2013.01); *G01C 21/3697* (2013.01); *G06F 3/0482* (2013.01); *G06F 3/04817* (2013.01); *G06F 3/04842* (2013.01); *G06F 17/3087* (2013.01); *H04L 51/10* (2013.01); *H04L 51/24* (2013.01); *H04L 67/06* (2013.01); *H04L 67/18* (2013.01); *H04W 4/021* (2013.01); *H04W 4/023* (2013.01); *H04W 4/206* (2013.01)

(58) Field of Classification Search
CPC ..... H04L 67/06; H04L 67/18; H04L 67/1097; H04L 51/10; H04L 51/24; G01C 21/362; G01C 21/3679; G01C 21/3697; G06F 3/04817; G06F 3/0482; G06F 3/04842; G06F 17/3087; H04W 4/021; H04W 4/023; H04W 4/206
See application file for complete search history.

(56) References Cited

U.S. PATENT DOCUMENTS

| | | | | |
|---|---|---|---|---|
| 8,447,324 B2 * | 5/2013 | Shuman | ............ | G06F 17/30041 455/456.1 |
| 8,682,889 B2 * | 3/2014 | Zheng | ............... | G06F 17/30041 706/12 |

(Continued)

*Primary Examiner* — Todd Melton
(74) *Attorney, Agent, or Firm* — The Concept Law Group, P.A.; Scott D. Smiley; Yongae Jun

(57) ABSTRACT

A method and device of sharing an event or experience by capturing a geographic location of the and at least one detail of the experience or event in the form of data such as video, text, sound, or pictures, with an electronic device, storing the geographic location plus the data on a database accessible to a plurality of users. The application further alerts a user or a plurality of users of the details of the experience when the user is near the geographic location where the at least one detail of the experience was captured and guiding the user to the geographic location where the experience was captured.

6 Claims, 9 Drawing Sheets

(51) Int. Cl.
*H04W 4/02* (2009.01)
*H04W 4/20* (2009.01)
*H04L 29/08* (2006.01)
*H04L 12/58* (2006.01)

(56) References Cited

U.S. PATENT DOCUMENTS 9,305,020 B2 * 4/2016 Jacoby .............. G06F 17/30241
2013/0086087 A1 * 4/2013 Jung ................ G06F 17/30041
                                                                                                     707/752

* cited by examiner

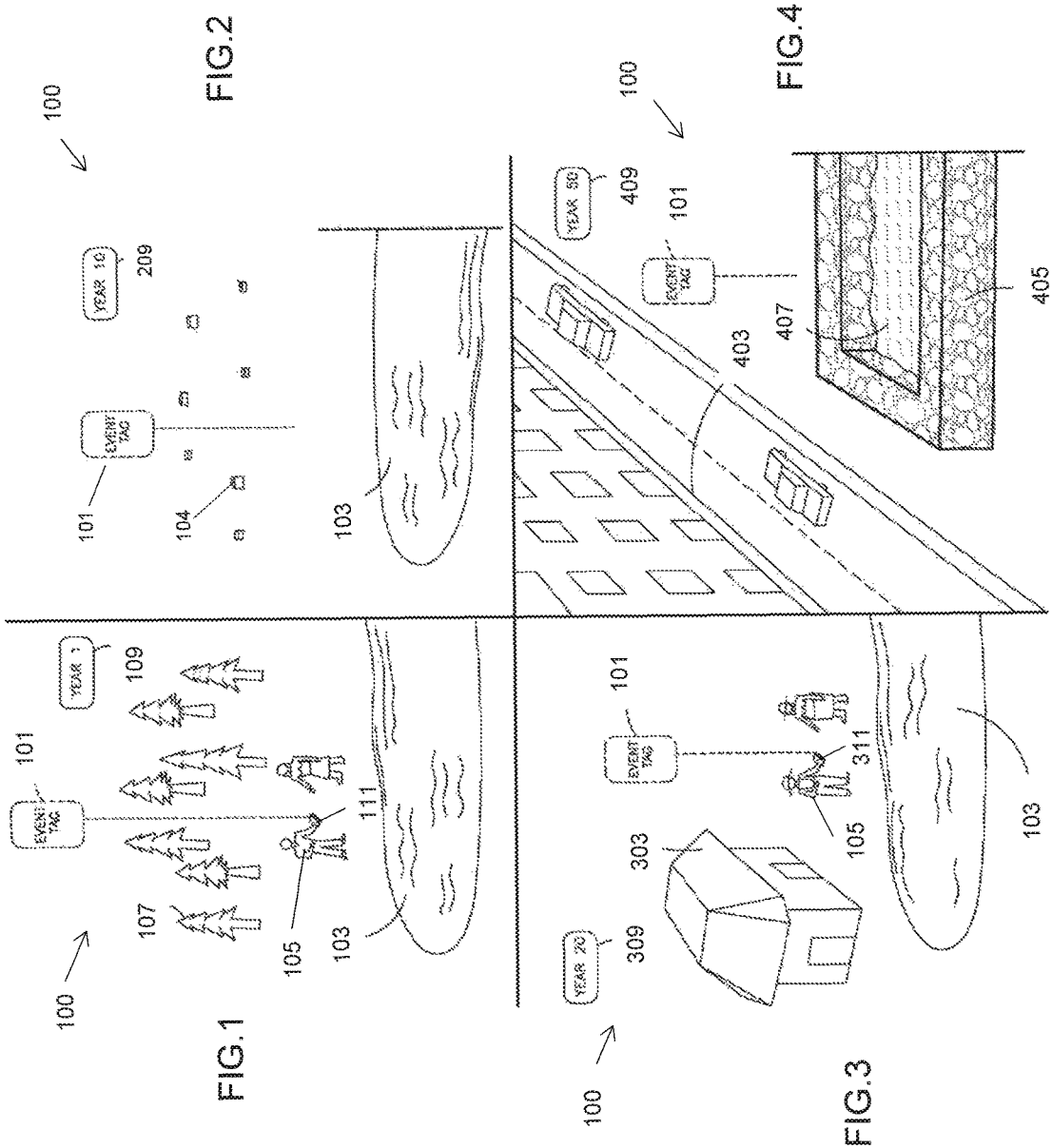

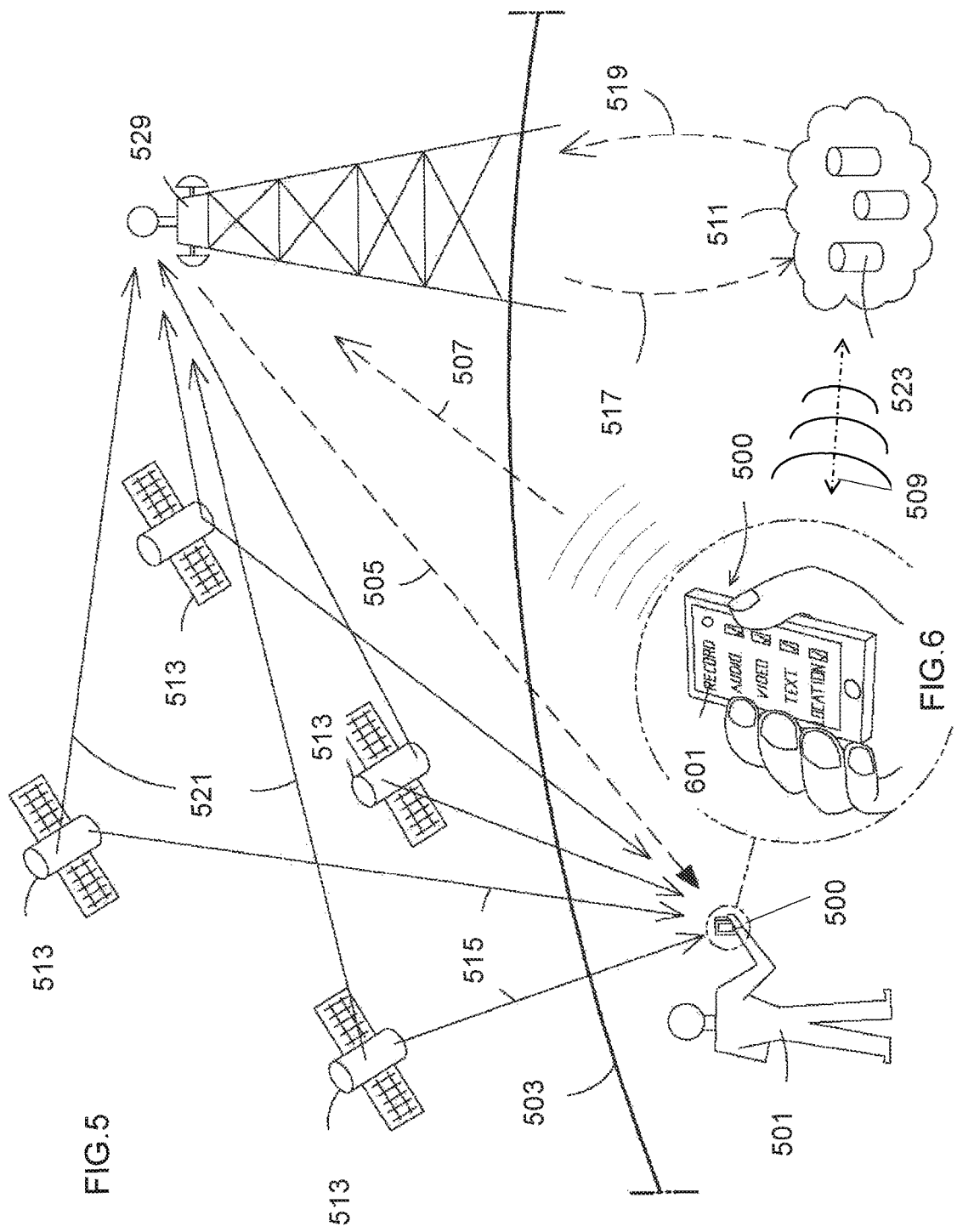

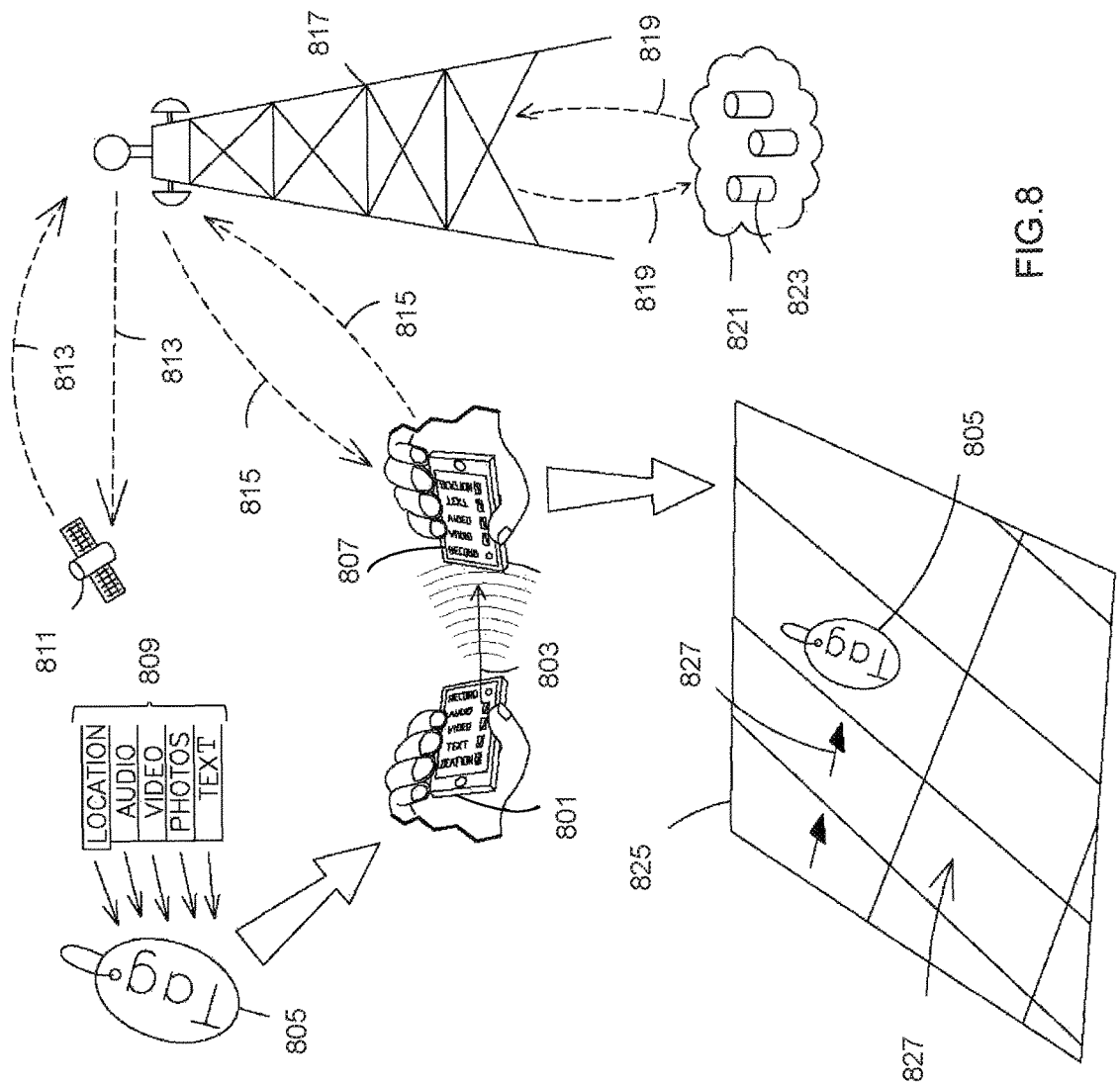

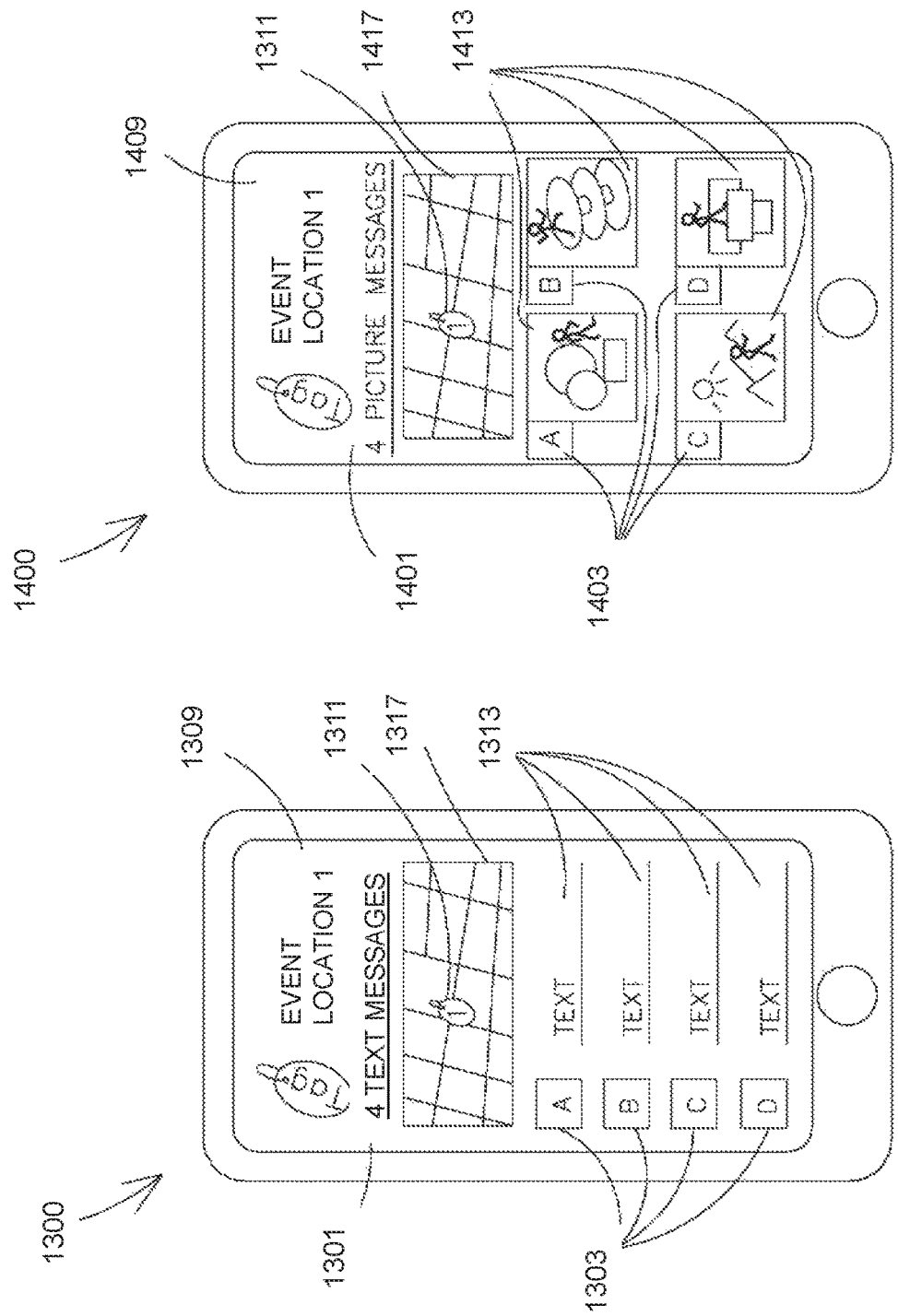

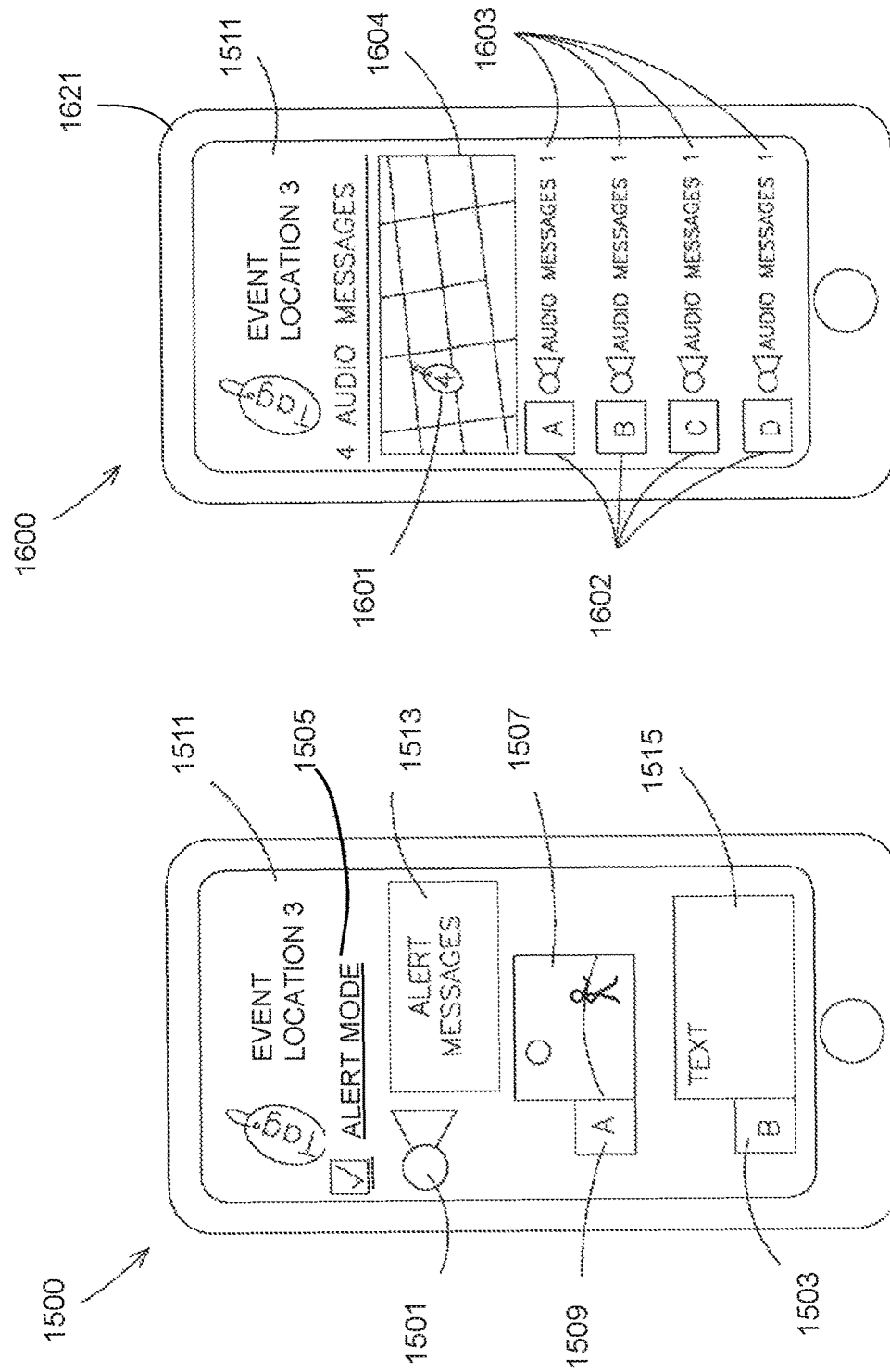

APPLICATION AND DEVICE TO MEMORIALIZE AND SHARE EVENTS GEOGRAPHICALLY

CROSS-REFERENCE TO RELATED APPLICATION

This application claims priority to U.S. patent application Ser. No. 14/029,850 filed Sep. 18, 2013, the entirety of which is incorporated by reference.

FIELD OF THE INVENTION

The present invention relates to memorializing events or experiences for sharing with others and, more particularly, a method of recording information associated with an event that takes place at a geographical location, notifying others of the event, sharing the information with others, and guiding them to the location.

BACKGROUND OF THE INVENTION

Preserving works and recordings in anticipation of future retrieval is a task that, until now, is usually only performed by librarians. Notably, presidential recordings, such as oval office recordings, tend to capture a president's thoughts for future generations to analyze and interpret. These audio, video, and text records are typically bound and confined to the compound that houses them, such as presidential libraries. For example, the Kennedy assassination tape will be most likely viewed at the Kennedy presidential library in Boston, and not on the street in Dallas, Tex.

Similar to a president recording his legacy for the future, people are now leaving their legacy in "cloud" internet services. FACEBOOK, TWITTER and INSTAGRAM are storing people's personal data, photos, comments, etc., for others to view and enjoy. The problem with "cloud" based services is that once a user leaves the account, the records will be erased and the rights to their data terminated. Similar to a video stored in a library, the information on FACEBOOK, other than being stamped with geographic labeling information, is not connected to the geographical location where the event originally occurred. A picture of one's wedding will be seen on some computer screen at someone's house and not at the beachfront where it took place. Those that visit the beachfront, for example, the married couple's grandchildren, might not have any idea that that was someone's wedding spot.

A fisherman that wishes to share his secret fishing spot, the best time of day to fish, the best lures, the best techniques, the ideal weather, etc., is currently left with the option of verbally telling someone or typing it in a message somewhere and directing it to a third party. The fisherman has no way of ensuring others near the spot will see his shared information. Likewise, someone that wants to receive such information must know the fisherman or be able to actively search, for example, on the internet, for such information.

Therefore, a need exists to overcome the problems with the prior art as discussed above.

SUMMARY OF THE INVENTION

The invention provides an application and device to memorialize and share events geographically that overcomes the hereinafore-mentioned disadvantages of the heretofore-known devices and methods of this general type and that store and transmit data in electronic devices.

With the foregoing and other objects in view, there is provided, in accordance with the invention, a method of sharing an experience that includes the steps of capturing, with an electronic device, a geographic location of the electronic device and at least one detail of a first user's experience. The geographic location of the electronic device and the at least one detail of the first user's experience is stored on a database that is accessible by many users. When the proximity between a second user and the geographic location is within a preset distance, several captured user experiences are provided to the second user for selection. A second user makes a selection of at least one of the many captured user experiences and at least one detail of the selected user experience is displayed to the second user.

In accordance with another feature of the present invention, a second user is alerted when the proximity between the second user and the geographic location is within the preset distance. The alert can be a text message, a sound, a vibration, a flash of light, a displayed icon, and more.

In accordance with a further feature, the present invention includes guiding the user to the geographic location where the displayed detail of the selected at least one of the plurality of captured user experiences occurred.

In accordance with yet another feature of the present invention, the at least one detail of a first user's experience is at least two distinct non-geographic details of a first user's experience.

In accordance with an additional feature of the present invention, the experience can be one that took place in the past or in the future.

In accordance with another feature of the present invention, the at least one detail of the first user's experience is captured in a set of fields specifically tailored to the type of experience being captured.

In accordance with the present invention, a method of storing and sharing a list of data and geographical location that corresponds to an experience includes the steps of providing an electronic device operable to capturing a geographic location of the electronic device and at least one detail of a first user's experience into a set of predetermined fields. The geographic location of the electronic device and the at least one detail of the first user's experience is stored on a database accessible to many users. A minimum proximity between a second user and one other user's experiences is detected. The system will alert the second user of the event stored in the database when the electronic device is near the geographical location of the at least one detail of the first user's and the many user's experiences. The second user will be guided to the geographic location where the first user's experience and the many user's experiences occurred. The method will further present several captured user experiences to a second user for selection and display to the second user at least one detail of the selected user experience.

In accordance with a further feature of the present invention, a mobile device operable to record an event at a geographical location includes a communication unit communicatively wirelessly coupled to a database, a GPS receiver unit operable to determine a geographical location of the communication unit, a memory unit operable to receive data and the geographical location of the communication unit pertaining to an event, both manually and in real-time. A processor is communicatively coupled to the communication unit, the GPS receiver unit, and to the memory unit and is operable to transfer the data and the geographical location of the event to the database, alert of the event stored in the database when the mobile device is near the geographical location of the event, retrieve, over the wireless network, the data of the event from the database, and guide the user to the geographical location of the event retrieved.

In accordance with yet another feature, a computer-implemented method of sharing an experience is described that includes a step of receiving, by a server, from an electronic device of a data-creating user: at least one detail of the data-creating user's personal experience; a geographic location of the electronic device associated with the data-creating user's personal experience; and a future event notification trigger created by the data-creating user via the electronic device of the data-creating user. In a further embodiment, after the step of receiving, storing, by the server, on a database associated with the server, the geographic location of the electronic device, the at least one detail of the data-creating user's personal experience, and the future event notification trigger; and after the steps of receiving and storing, communicating, by the server, at a date indicated by the stored future event notification trigger, to an electronic device of at least one second user indicated by the stored future event notification trigger, the at least one detail of the data-creating user's experience.

In accordance with yet another feature, an embodiment of the present invention includes automatically communicating, by the server, at the date indicated by the stored future event notification trigger, to the electronic device of the at least one second user indicated by the stored future event notification trigger, the at least one detail of the data-creating user's personal experience.

In accordance with yet another feature of the present invention, the at least one detail is formed as at least one of a textual description, a photograph, an audio file, and a video file.

In accordance with an additional feature, an embodiment of the present invention includes, as a result of receiving a geographic location of the electronic device of the at least one second user and determining that the geographic location of the electronic device of the at least one second user is within a preset distance from the stored geographic location of the electronic device of the data-creating user, automatically communicating, by the server, at the date indicated by the stored future event notification trigger, to the electronic device of the at least one second user, the at least one detail of the data-creating user's experience.

In accordance with yet an additional feature of the present invention, the date indicated by the stored future event notification trigger is associated with at least one of a birthday and an anniversary.

In accordance with yet another feature, the at least one second user includes a plurality of users, each with remote access, via their respective electronic devices, to the server and the database associated with the server.

Although the invention is illustrated and described herein as embodied in a an application and device to memorialize and share events geographically, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention regarded as novel, it is believed that the invention will be better understood from a consideration of the following description in conjunction with the drawing figures, in which like reference numerals are carried forward. The figures of the drawings are not drawn to scale.

Before the present invention is disclosed and described, the terminology used is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

The terms "program," "software application," "mobile application," "application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

In this document, the term "geolocation," "geographical location," "GPS location" or "location" should be understood to mean the identification of the real-world geographic location of an object, such as a, electronic device, mobile device or an internet-connected computer terminal and the practice of assessing the location, or to the actual assessed location on planet earth. As a non-limiting example, it also includes using positioning systems to determine a meaningful location (e.g. a street address) including a set of geographic coordinates around the earth.

In this document, "mobile device" should be understood to mean a handheld computer or a small handheld computing device, typically having a display screen with touch input screen and/or a miniature keyboard. A mobile device as disclosed should not be limited to IPHONE or ANDROID mobile phones or tablet devices.

BRIEF DESCRIPTION OF THE DRAWINGS

The accompanying figures and reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is an illustration of the first frame in a sequence of events;

FIG. 2 is an illustration of a second frame in a sequence of events;

FIG. 3 is an illustration of a third frame in a sequence of events;

FIG. 4 is an illustration of a fourth frame in a sequence of events;

FIG. 5 illustrates an exemplary method of storing and sharing data and geographical locations that correspond to an event;

FIG. 6 is a detailed view of the mobile device depicted in FIG. 5, showing how to record and share an event at a geographical location using a mobile device operable to receive real-time data pertaining to the event;

FIG. 8 illustrates an interaction of components used to store, find, and share a list of data and a geographical location that corresponds to an event or a multitude of events;

FIG. 13 is an elevational face view of a mobile device showing a touch-screen with the "text messages" feature of the mobile application;

FIG. 14 is an elevational face view of a mobile device showing a touch-screen with the "picture messages" feature of the mobile application;

FIG. 15 is an elevational face view of a mobile device showing a touch-screen with the "alert mode" feature of the mobile application;

FIG. 16 is an elevational face view of a mobile device showing a touch-screen with the "audio messages" feature of the mobile application.

DETAILED DESCRIPTION

Figure 7:
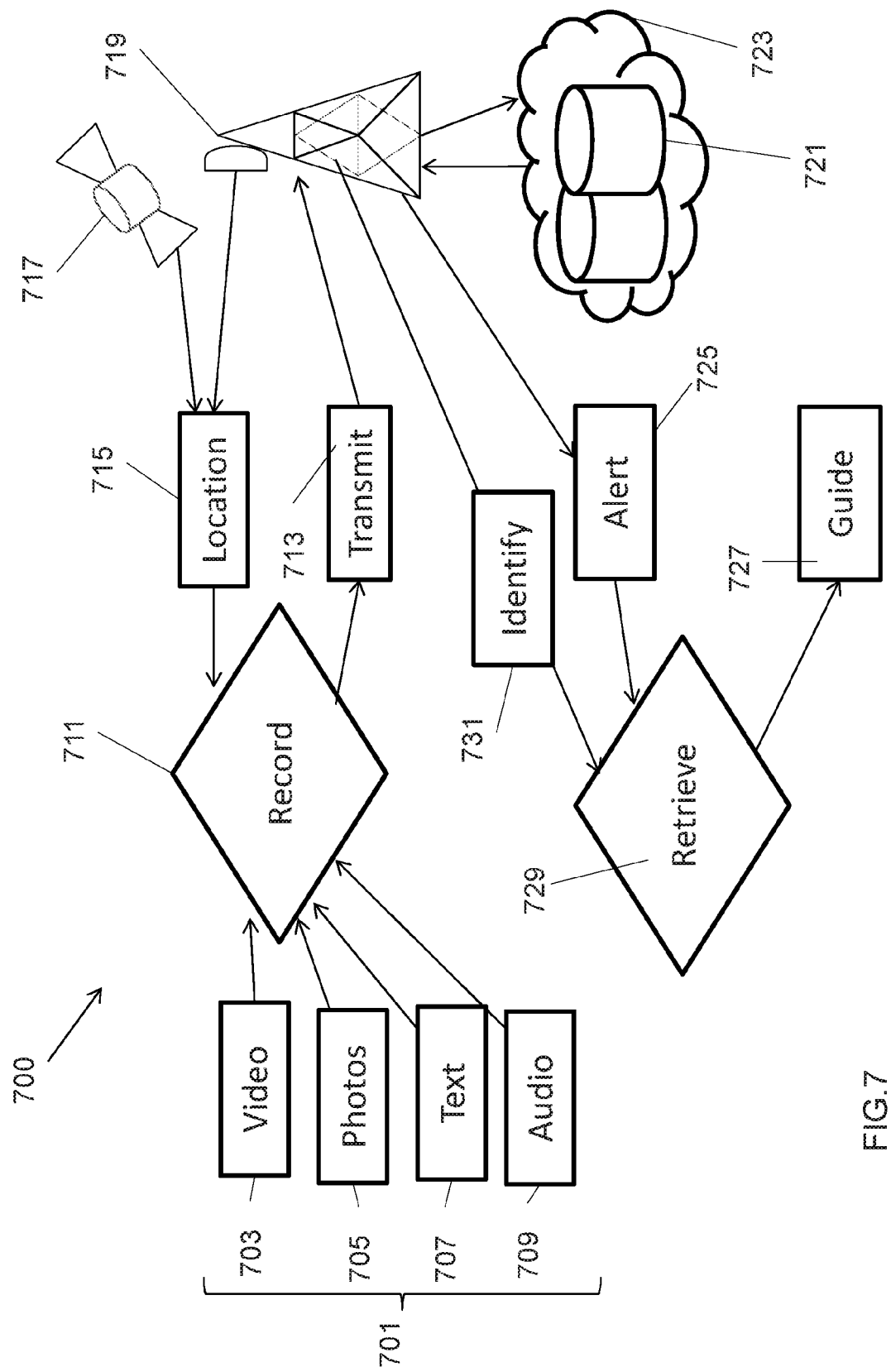
FIG. 7 is diagram showing an interaction of steps for storing and sharing data and a geographical location corresponding to an event.

While the specification concludes with claims defining the features of the invention regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

As explained above, both FACEBOOK posts and presidential recordings capture views, feelings, and opinions and relay them to others in the future. There is a need to create the opposite, a geographical location that holds views, feelings, opinions, and other information associated with that location for future generations to retrieve.

The invention (both software and hardware) provides for an easy way for a person to save the memories and details of events such as marriage, an activity such as fishing, or an experience such as a camping trip, and later, guide friends to find and relive the event, activity or experience. The invention utilizes a mobile device that will alert friends while in the proximity (geographical location) where the event, activity or experience took place. The memories and details of these events will be stored on the internet with a geographic location tag given by the global positioning system (GPS) in the mobile device.

The details of the happenings in the events will be memorialized by recording: video, photos, voice or sound, and text for later retrieval. All of the memorialized details will form a collection of data to paint a vivid picture of what happened on or near a geographical location in the past, for friends to re-live in the future. The event's virtual geographical recording of data will be fixed to the location of the recording regardless of the changing environmental or structural conditions. Furthermore, the details of the events will also be created by choosing specific pre-programmed fields to the type of experience being captured. For example: birthdays, wedding anniversaries, fishing trips, hiking trips etc., and more.

The compilation of data files, video, sound, text etc., and the geo-location (latitude and longitude) where the data was recorded, together, is called an "event-tag." The following are non-limiting examples of event-tags embodied in the specification and the claims: An event-tag could be a user's personal journal of places he or she visited to share with others. A user will have the choice to share his or her event-tag privately or publicly. This will allow a person to leave a virtual message "at a geo-location" that could be used for an unlimited number of purposes.

An exemplary purpose includes a user leaving an event-tag to be enjoyed by the public in the form of: a photo, a video, a text, or a note while walking through his old neighborhood. That event-tag would be saved into a database and will be associated with geographic coordinates of the old neighborhood. Several years later, on a drive in the proximity of the old neighborhood, the user's smartphone would automatically alert that a message of a past event-tag was recorded there. Since the alert was triggered based on longitude/latitude or GPS, the mobile device would alert the user to stop. The user will be guided to the same neighborhood, which might now be completely changed. The user will then be able to see, read about, and/or hear what the surroundings looked at the time the recording.

Another usage is an event-tag created at a historic location, which leaves a message for future generations to retrieve. Going on a tour of Washington D.C., a user will be able to see what other people were thinking and the details of their experience when they were at the feet of, for example, the Lincoln monument. As another non-limiting example, at this same location, a national park service tour-guide could leave both audio and video of the Martin Luther King "I have a dream" speech as an event-tag.

An event-tag could be a tool for fishermen, campers, or any outdoor enthusiasts who want to keep a journal of places they have been. An event-tag could be a note stating significant details of the experience: "caught a lot of fish at this location using live bait," or "visited this cabin in the woods." If the event is selected as one to be shared, a second fisherman visiting the spot anytime in the future, can retrieve the notes/advice recorded by the first fisherman and can benefit from that advice. For example, suppose a fisherman learned that fishing with a certain type of bait at 5:00 AM during the spring resulted in the best results. Years later, his great-grandson can benefit from this advice being passed down, even though the great-grandfather is no longer alive. Through use of the present invention, even if the great-grandson was not aware that such information was recorded, when he gets close to the location, e.g., visiting the family farm, his device will alert him that a message exists and will even guide him to the precise location where it was recorded.

Significant sporting events can be memorialized using event-tags. An event-tag could be created the day that a user's favorite team won the Super-bowl or the Stanley cup. By recording video, photos, audio recording and text comments, a user can retrieve and re-live the event in the future.

Users can search their location proximity and be alerted for event-tags using their mobile devices. Example of events that a user will be alerted of include: alerts of theft lost or found items, job postings, business reviews, a user's personal milestones etc., and more.

FIGS. 1-4 are a sequence of illustrations of events to be viewed in order, starting with FIG. 1 and ending with FIG. 4. In each illustration, the same geographic location is depicted at different times (shown as 109, 209, 309, and 409) in a sequence starting from FIG. 1 as the earliest and ending with FIG. 4 as the latest.

FIG. 1 depicts the creation of event-tag 101 at year one 109. The event-tag 101 could be, for example, romantic event details of the marriage proposal of user 105. The depicted embodiment of FIG. 1 embodies an event, namely, a marriage proposal at a location represented as reference number 100 between the woods 107 and the lake 103. The event-tag 101 was created by user 105, recording details of the marriage proposal, using his mobile device 111. The user 105 recorded a video of the surroundings, a picture of the future wife, some text describing details of the experience, and voice recording of the proposal.

FIG. 2 shows that ten years, indicated by 209, have passed at the same location 100 since the event-tag 101 of FIG. 1 was created. FIG. 2 shows the second time in the "time stamp" sequence of FIGS. 1-4. FIG. 2 shows that the woods 104 of FIG. 1 have changed, i.e., been cut down, but the lake 103 remains. The event-tag 101 also remains in place as a digital imprint (virtually) in a database on the internet containing a detailed account of the events that happened 10 years ago, i.e., the proposal of user 105 (in FIG. 1).

FIG. 3 shows that twenty years, indicated by 309, have passed at the same location 100 since the event-tag 101 of FIG. 1 was created. FIG. 3 shows the third "time stamp" in the time sequence of FIGS. 1-4. FIG. 3 shows the woods have been replaced with houses 303, but the lake 103 remains in its original form of FIG. 1. Despite that the woods 107 of FIG. 1 are no longer there, the user 105 has returned to location 100 guided by a mobile device 111. The mobile phone application (not shown) includes a map that showed him the way to the event tag 101. User 105 brought his wife to remember the time when he proposed twenty years ago. User 105 was then also able to extract a video of the surroundings, a picture, the text and recording of the marriage proposal while standing next to the lake 103.

FIG. 4 shows that fifty years, indicated by 409, have passed at the same location 100 since the event-tag 101 of FIG. 1 was created. FIG. 4 shows the fourth "time stamp" in the time sequence of FIGS. 1-4. FIG. 4 depicts drastically different surroundings due to the changes since the creation of event tag 101 seen previously in FIG. 1. The houses 301 of FIG. 3, are now gone, the woods 107 of FIG. 1 have disappeared also, and the lake 407 has now been contained by walls 405 due to urbanization 403. Notice that event-tag 101, the detailed memories of the marriage proposal, still remains at this location 100. Using a mobile device 311, the stored memories can be automatically presented to future users when the get near the location or other when other criteria are met or they can be searched and found by those users.

FIG. 5 provides a perspective illustration of a novel and effective handheld mobile device 500 operable to record a detailed event at a geographical location on earth 503. FIG. 6 is a close-up perspective detailed illustration of an exemplary mobile device 500, such as that shown in FIG. 5. The mobile device 500 uses a wireless cellular network 507 or a WiFi network 509 to connect to the internet 511, which will further communicate with the database servers 523. This means that mobile device 500 could use the infrastructure of a wireless communication antenna 529 or physical lines in any network. The cloud or internet 511 will have constant real-time up 519 and down 517 link communication to the antennas 529 to transfer data to and from the mobile device 500. If the mobile device 500 is connected to a WiFi 509 network, similar two way instant communication will occur between the internet 511 servers 523 and the mobile device 500.

Most smart phones today have a GPS chip that uses satellite data to calculate a mobile phone's 500 exact position. GPS is actually a constellation of 27 Earth-orbiting satellites 513 circling the earth 503. The orbits are arranged so at anytime, anywhere on Earth, there are at least four satellites "visible" in the sky. Using trilateration and analyzing high-frequency low-power radio signals, a GPS receiver in a mobile device 500, finds the location of at least three satellites 513 and the distance 515 between the user 501 and each of those satellites 513. The receiver unit can then find how far the signal has traveled by timing how long it took the signal to arrive. Based on the intersection of the fixed orbit of three satellites 513, it gives the precise geographical location of user 501. The location information is then transferred through signals 521 to the cellular towers 529, which are then transferred back along signals 505 to the cellular device's 500 receiver unit.

If a GPS signal is unavailable, the device 500 will be able use information from cell towers 529 to triangulate the user's approximate position. The geo-location system used by device 500 will also be able to use a combination of: GPS satellites 513, cellular tower 529 site triangulation, local Wi-Fi networks 509 to zero in on the location of a device 500, and others. This arrangement is called Assisted GPS (A-GPS). Other ways to find the geographical position have been envisioned, such as: geographic latitude and longitude, Cartesian coordinates, Universal Transverse Mercator coordinate system, Universal Polar Stereographic coordinate system, and more. After the location is found by GPS or A-GPS, commercial map services such as GOOGLE MAPS, BING MAPS, APPLE MAPS and/or mobile device built-in map services can then map the location in the mobile device 500. Once the geo-location has been created, a commercial map service will guide the user 501 to that location.

In FIG. 6, a detail illustration of the mobile device 500 of FIG. 5 shows that the mobile application 601 will allow users to store text, photos, audio or video messages, geolocation, and more in real-time. Now referring to FIG. 7, a flow diagram illustrating a method 700 for memorializing an event at a geographical location is shown. FIG. 7 can be viewed in conjunction with FIG. 6. The text 707, photos 705, audio 709 and video 703 messages are represented together as "data" referenced by number 701. As the event happens, the data 701 from the event happenings will be recorded 711 into a local memory inside the mobile device. The data 701 is then transmitted 713 over the cellular network and towers 719 to the internet 723 or other networked remotely accessible database. The data 701 is then stored on servers 721 in the cloud or internet 723 for later retrieval. The user will then be able to retrieve 729 the data 701 stored in the servers 721. The user will also be alerted 725 when getting into the proximity of an event stored in the servers 721. It is envisioned that the mobile device is going to identify 731 and alert 725 when a user is within geographic proximity (a preset distance) of another user's data 701 reference location, e.g., location 100 of FIGS. 1-4. After retrieval 729, the user will be then guided 727 to the geolocation of the event using commercial map services. Identification 731 consists of the validation of the identity of a friend or a foe before the data 701 is transmitted for retrieval 729.

In FIG. 8, a method 800 to record and share an event virtually at a geographical location is illustrated. Here, the mobile device 801 is operable to transfer the data 809 stored as an event-tag file 805 plus GPS location to another mobile device 807 wirelessly 803. It is envisioned that the wireless 803 phone-to-phone communication includes: BLUETOOTH, infra-red, WiFi, and other short range communication protocols between devices. Here, the recipient mobile device 807 can download the event-tag file 805 stored on the servers 823 online 821 through a WiFi wireless network 819 or a cellular network 815 using cellular antennas 817. A cellular antenna 817 to satellite 811 communication is also envisioned as a medium to transfer and download files. Once the receiver mobile phone 807 has downloaded the file 805 with the data bundle, the mobile device will open its content, and, by using a commercially available map 825 (enlarged view of a map inside a phone), guide 827 the user to the location where the tag file 805 was created. It is further envisioned that the data 809 will be compressed as a single file 805, which allows for fast transfer both to and from the servers 823 and mobile devices 801, 807. By placing the single file 805 on internet network 821, a plurality of mobile devices can download the file at the same time.

The software interface for the mobile application will connect remotely to the online 821 application server 823. This server 823 will act as a conduit for users to communicate back and forth with the Server database (not shown). This allows a single file 805 to be used by a plurality of users in any type of mobile device 801, 807. As a non-limiting example, an application Server and SQL Server will be running on the WINDOWS SERVER 2008 operating system. The mobile application could run on the ANDROID or IPHONE operating systems, which come with a software framework with prepackaged components to create: menus, hookup buttons, and other common functions expected of any mobile device. The communication will be between the user's phone 801 or 807 and the mobile application server 823, which will be sending and receiving 819 data information queries or updates requested back and forward through the wireless network 815.

In addition, several embodiments of the invention, shown in FIGS. 9-17, provide for a mobile application, represented by reference numbers ending in 00, configured for personalized customization by a user. It is envisioned that the software could be developed using the APPLE and ANDROID development kits, Xcode and ANDROID SDK. The back-end application server 823 could handle the user's requests and could be running MICROSOFT WINDOWS SERVER 2008. This software application will allow users to have a seamless experience even if they switch from an IPHONE to an ANDROID or vice versa, and will be designed to interface with the hardware present on the IPHONE, ANDROID, and any other phone. It is envisioned in other embodiments that the application would run other devices that can emulate any operating system.

It is further envisioned that the mobile application may be accessed via web pages using a (non-mobile device) desktop computer. Communication with the application server could be required, to cellular networks or WiFi using HTTPS. The system will also use the application server for users to log in. The mobile device or electronic device to be used in conjunction with this application should meet minimum operating system requirements to install, download, and run the mobile application.

It is suggested the mobile device to be used in conjunction with the software application should have a communications unit operable to send wireless data to a database on the internet. A typical communications unit includes wireless communication chips or a single chip solution, such a BROADCOM's chipset that supports four wireless technologies: WiFi, 802.11, MAC, and Bluetooth. It is also suggested the device should also include a GPS receiver unit, operable to obtain a geographical location. A typical GPS receiver includes a baseband chip, such as the FUJITSU MB87Q2040 which interfaces to a host CPU/MCU via an UART serial interface, and should operate in both "autonomous GPS/standalone" mode and "assisted GPS" mode. It is further suggested the device should include a memory unit such as: RAM, ROM, DDR2, DDR3L, DRAM, SRAM, FIFO, EPROM, PROM, EEPROM, and any combination. Finally, a multi-bit processor such as the ones made by INTEL or AMD may be included. It should be understood that the aforementioned hardware requirements are merely suggestions as to the qualification of an electronic device to be used together with the software; more or less hardware could be added or subtracted, used in a similar way, for the same purpose, to accomplish the same result.

The goal of the software is to memorialize and share details of an event or experience captured at a geographical location in an easy and user-friendly way. The software interface allows anyone using the application to view and post geo-location data together with other data that can be shared with a group of specified users. The data-creating user can specify which people or types of people, e.g., relatives, friends, coworkers, persons of a certain nationality, or other types or people can access the data. The data-creating user can also specify the distance from the target event that a second user should be within before being notified of the event/recorded information pertaining to the event. This will allow for users to interact with each other as their geo-location paths cross. The data-creating user can also set events that will trigger notification to other users. For example, the data-creating user can specify that when his relatives celebrate a wedding anniversary, they are notified of the ancestor's anniversary. The application enables users to utilize data such as: text, images, or video messages with geolocation functions on a mobile device knowing they will utilize this technology in their own specific ways. Users will also be able to capture (in a set of specific fields) pre-programmed to the type of experience being experienced making the application very user friendly. The mobile devices, phones, tablets, etc., should meet the minimum operating system requirement or higher to install and run this mobile application. Users could download the mobile application from portals such as AMAZON, GOOGLE PLAY or the APP STORE and more.

For the ANDROID app, the software should run on the ANDROID operating system. The software should also use the programming language supported by the ANDROID development environment, java plus the ANDROID SDK. The database used by the mobile application software should be the same for IPHONE, ANDROID, and Web.

Figure 9:
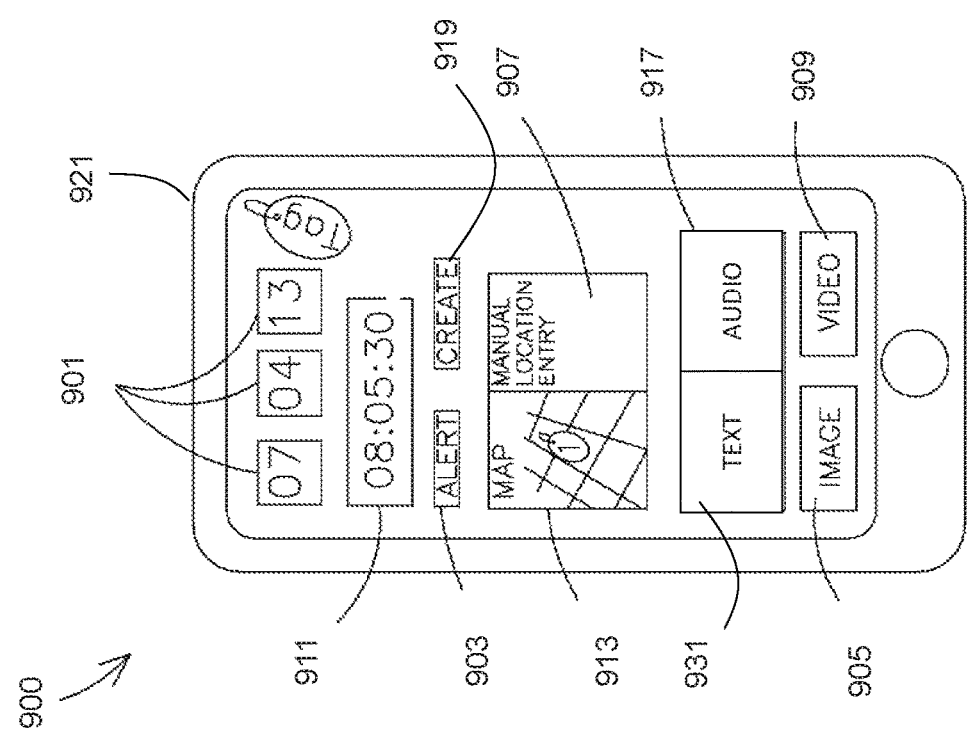
FIG. 9 is an elevational face view of a mobile device showing a touch-screen with the "alert" and "create" features of the mobile application.

FIGS. 9-16 provide several embodiments of the present invention in a top view of a touch-screen of a mobile device generally represented by reference number ending in -21. FIG. 9 shows several advantageous features of the present software interface, but, the interface can be provided in several shapes, sizes, names, icons, combinations of features, buttons and components, and varying numbers and functions, icons, name of the components, and buttons.

In FIG. 9, the application 900 utilizes the "event-tag" concept to capture/create, identify index, store, share, and retrieve user data on a mobile device 921 touch screen. The application 900 allows a user to create data such as: a video 909, a picture image 905, audio 917, text 931 messages and any combination to be stored in different fields. It also allows for the creation of detailed lists of instructions by using several videos 909, picture images 905, audio 917, and text 931. The application 900 also allows a user the option to adjust the time 911 stamp by using scroll down and point and fill menus. It further allows a user to acquire the user's GPS coordinates 913, location, or allows for manual entry 907 of a location that will generate a longitude/latitude coordinate. In the manual entry mode, the user can set details of an event at a location even though the user isn't there. For example, the user can enter all of the details of his proposal to his wife at the top of mountain in Italy, even though he forgot to do it while he was there. In the future, his children may visit the same mountain and be pleasantly surprised when their phones or other mobile devices notify them of this recorded event.

Finally, the present invention wirelessly transfers the data created to a server on the World Wide Web or any other network. After the data compilation/creation, the application 900 will allow sharing or posting amongst other users (friends), and to social media. The application 900 will have a button that is used for automatically alerting 903 if the user is within the geographical proximity of an event-tag posted by him or others. It is envisioned that the software will include pre-programmed/predetermined fields that will self-populate and give the option to save videos 909, picture images 905, audio 917, and text 931 automatically. Non-limiting examples of predetermined fields include: proposals, birthdays, wedding anniversaries, sporting events, fishing trips, hiking trips, vacations etc., and more.

Figure 10:
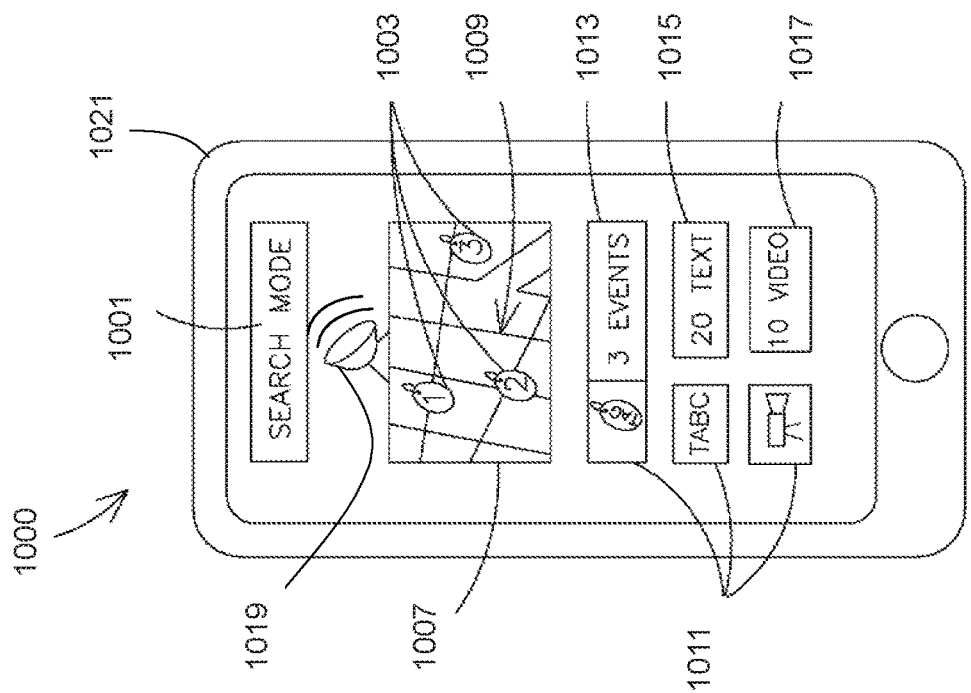
FIG. 10 is an elevational face view of a mobile device showing a touch-screen with the "search" feature of the mobile application.

Now referring to FIG. 10, the mobile application 1000 will allow users to search 1001 and identify friendly geo-location messages such as event-tags from their mobile phone 1021 touch screen. The mobile application 1000 will find all the event-tags 1003 based on the user's geo-location. The persons identified as friendly will be displayed by using conventional map 1007 technology. The user will be able to zoom in or out to view single or multiple event-tags 1003 by using the touchscreen. The mobile application 1000 will give a total number 1013 of event tags 1003 found, and show the closest road 1009 to the event-tag location 1003. It will also show the total number of text 1015, images or video 1017 found within the radius specified, a preset distance, in the settings (not shown). The application will include easy recognizable icons such as the one depicted in reference number 1011. If the network is down or inaccessible, the application 1000 will show the user 1019 using a sound or icon. The user will be also able to select in their settings (not shown) to search for a specific date range, and when the results are found, the results will be displayed with the latest posted on top.

Figure 11:
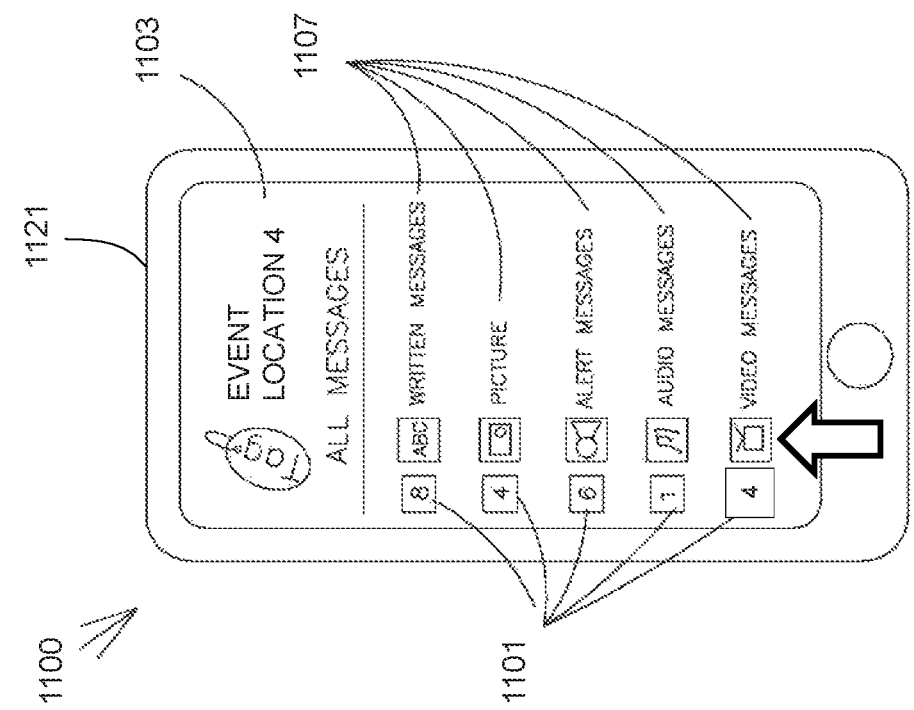
FIG. 11 is an elevational face view of a mobile device showing a touch-screen with the "all messages" feature of the mobile application.

After searching and identifying the event-tags shown previously in FIG. 10, now in FIG. 11, the results of the search are displayed in the mobile application 1100 interface. Here, the reference number 1101 represents the number of users that have left event-tag data at "event location 4" 1103. The data 1107 recorded and associated with this geographical location of "event location 4" 1103 is shown both as an icon and text. It is envisioned that events will have different amounts and types of data attached. The user will be then press the button with the icon (signaled by the arrow) he or she wishes to see.

Figure 12:
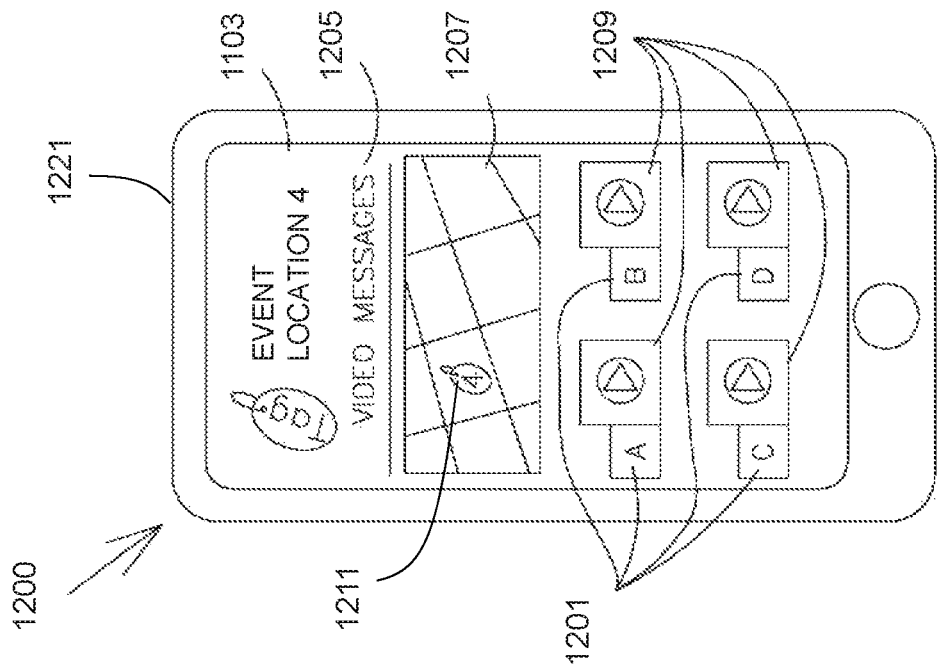
FIG. 12 is an elevational face view of a mobile device showing a touch-screen with the "video messages" feature of the mobile application.

FIG. 12 depicts the video message interface 1200 on mobile device 1221 touch screen, after the user has pressed the video messages button at the bottom of mobile device 1121 in FIG. 11. Every interface such as the one with reference number 1200 has a label 1205 that shows the user what interface it is viewing. Here, at "event location 4" 1103 (same as in FIG. 11), there are four video messages 1209 to be retrieved. Each of the four video messages 1209 are associated with four users represented here as A, B, C, and D in reference number 1201. These are the videos 1209 that the users 1201 previously created at event-tag location 1211 with the same geographical location 1211 shown in map 1207. The users A, B, C, and D 1201 created the messages at different times, in different order and, in their system preferences (not shown), allowed for the public to search, find, and alert them of their video tags.

FIGS. 13-14 depict the text message interface 1300, 1400 as seen in a mobile device touch screen. FIG. 13 shows the interface 1400 after the user has pressed the text messages button or icon on mobile device 1121 (in FIG. 11). It shows that at "event location 1," 1309 there are four text messages 1313 to be retrieved 1301. Each of the four text messages 1313 are associated with four users represented here as A, B, C, and D, in reference number 1303. These are the text messages 1313 that the users 1303 created at event-tag 1311 with the geographical location in map 1317.

At the same "event location 1" 1311 of FIG. 13, now in FIG. 14, there are four 1401 picture photos 1413 to be retrieved. Each of the four photos 1413 are associated with four users represented here as A, B, C, and D in reference number 1403. These photos 1414 were created at the same location of event-tag 1311 of FIG. 13.

In one of the embodiments of the mobile application 1500, now in FIG. 15, shows how users will be notified and alerted by mobile phone 1621 as they approach an event-tag, or are near its geographical location. The location envisioned for this event-tag embodiment is a hiking trail in a mountain. As the user is walking up the mountain, the user will check the alert mode button 1505, and when an event is in the proximity, the "event-location 3" 1511 sign will be displayed. The notification of that an experience or event is near is accomplished by using; a sound 1501, a song or ring, vibration (not shown), flashing a sign such as the one shown here in 1513 and any combination. Pop-up signs or text-alerts such as the ones standard in operating systems of smart phone technology are also envisioned. On the same interface application 1500, the user will be able see the data recorded for that location. Here user "B" 1503 left a text message 1515, a detailed list, or a set of instructions about his hiking trip at a geographical point in the hiking trail. Similarly "A," another user 1509, left a photo showing his experience while hiking that same trail.

FIG. 16 depicts the audio notification interface application 1600 as seen in a mobile device 1621 touch screen. Here, users A, B, C, and D, 1602 have each posted one audio message 1603 or instructions regarding an experience while at geographical location 1601 displayed in map 1604. As seen previously in FIG. 15, "event location 3" 1511, the hiking trail, now in FIG. 16 shows that several people 1602 left a multitude instructions regarding the trail. Since the user had the "alert mode" 1505 of FIG. 15 "on," as the user approached this location 1601 in the trail, the user was notified of the audio messages 1603. The audio messages previously left by other users 1602 revealed there is a snake pit close and he should take another rout.

As shown in FIGS. 9-16, it is envisioned that in all mobile phone interface applications 900, 1000, 1100, 1200, 1300, 1400, 1500, and 1600, all users shall be able to do the following: zoom into images 1413, 1507 using the standard gestures; view the next message 1513, 1015, and 1515 by swiping left to right; navigate back to the previous screen via a back button (not shown); perform a search on the list of found messages (not shown); and to save in the mobile device; messages, pictures or videos.

Figure 17:
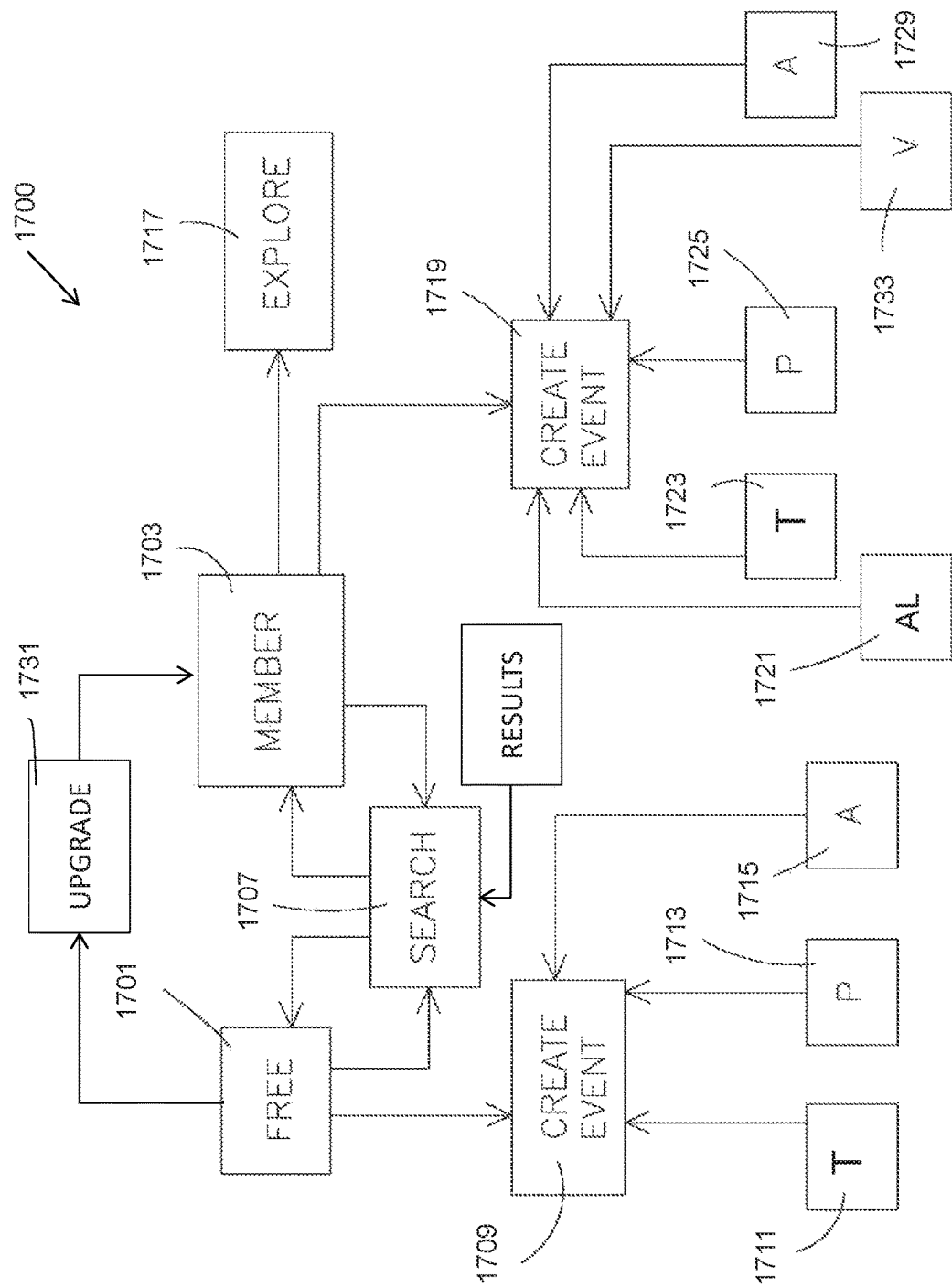
FIG. 17 is a flow diagram providing the sequence of steps in a mobile application to store and share a list of data and a geographical location, having a free version and a paid member version.

Now referring to FIG. 17, a flowchart diagram of an embodiment of the free 1701 and paid member 1703 versions of the mobile application 1700 software. Flowchart diagram FIG. 17, should be viewed in conjunction with FIGS. 9-16.

A user should download the mobile application 1700 in two versions; a free 1701 version and a paid or subscription member 1702 version. After installing the application 1700 from ITUNES or the APP-STORE, the user will be asked if they would like to continue to the free 1701 version or to upgrade to the full/paid member 1703 version. Upon selecting the free 1701 version, the user can select from the following menu options: "search alert for event-tag" 1707 (also shown in FIG. 10), or "upgrade" 1731 to full member 1703 version. Based on the selection of "search alert for event-tag" 1707 the following will be listed: a dropdown field menu (such as the one previously shown in FIG. 9) specifying the alert radius (distance and time), a radio button list specifying: today, this week, last two weeks, last month, last three months, last six months, last year, specific date range Jan. 1, 2013 to Aug. 31, 2013. Once the user submits his or her queries, the alerts will be displayed. As previously shown in FIGS. 11-14, text, image, and video alerts will be grouped separately showing the total number of each group found. A free 1701 user can then select an alert group and view the messages in that group.

In the free 1701 version, based on the selection of "create event" 1709 the following will be shown (see in general FIG. 9): a text 1711 field for the user to input a message, an icon or button of a camera, that once clicked will allow the user to insert a picture 1713 from his or her photos, and an audio 1715 icon for audio messages. The free 1701 version will not have an option to make this message public or private to specific friends. The free 1701 user would not be able post this message with the current geolocation and the current date. Free 1701 users will also not be able view video messages, and the number of viewable pictures messages will be limited. After a free 1701 user has reached the limit of picture messages per day, he or she will be challenged to upgrade 1731 to the full member version of the application.

Upon selecting the full member 1703 version, the user will be presented with the "my profile page," (not shown) where a full profile will be required to be filled. Based on the selection of "my profile" the following fields will be listed: users phone number, first name, last name, email, city, and country. After completing their profile, the menu will be view search 1707 alerts event-tag, create an event 1719, and explore 1717. Other envisioned embodiments could include post a message, my friends, and my profile. Based on the selection of "search alert for event-tag" 1707, the following will be on the interface (see FIG. 10): a button to view the user friends' event-tags, a dropdown menu specifying the alert radius, a button list specifying: today, this week, last two weeks, last month, last three months, last six months, last year, and a specific date range such as Jan. 1, 2013 to Aug. 31, 2013. Once the user submits his or her query, all the event-tags searched 1707 will be displayed. As shown previously in FIGS. 11-16, text 1723, picture image 1725, and video 1733, and alerts 1721 will be grouped separately showing the total number of each group found. The user will be able to select any event-tag group and view the messages in that group.

In the full member 1703 version, based on the selection of "create event" 1719 the following fields will be shown (see generally FIG. 9): a text 1723 area for the user to input a message, an icon or button of a camera, that once clicked will allow the user to insert a picture 1725 from his or her photos, an icon or button of a video camera, that once clicked will allow the user to insert a video 1733 from his or her videos, an audio 1729 icon for audio messages and an option to make this message public or private to specific friends (not shown). The user may now post this message with the current geolocation and the current date time or the user may predate or postdate this message. It is envisioned that each user will have a list of favorite "friends" and the following could be listed: a list of the current user's friends along with the number of unread messages from that friend in which you were tagged. The will also be and option to invite a friend via text message and the option to delete a friend (not shown).

A mobile device to record an event virtually at a geographical location and method of sharing an experience has been disclosed. As an example, the device would alert and guide someone to find the actual location where a president gave a speech and listen to that speech. The software and device will allow for a mobile device user to while standing at a historic place, read, see and listen what others in the past saw when they stood at the same historic place. The mobile-application allows for the recording of public messages, instructions, guides, details, explanations, photos, journal notes, etc., of an event or experience, giving it a time, location, and post-it on a cloud server for other to retrieve in the future; messages locked into a geographical location forever.

What is claimed is:

1. A computer-implemented method of sharing an experience, the method comprising steps of:

receiving, by a server, from an electronic device of a data-creating user:

at least one detail of the data-creating user's personal experience;

a geographic location of the electronic device associated with the data-creating user's personal experience; and a future event notification trigger created by the data-creating user via the electronic device of the data-creating user;

after the step of receiving, storing, by the server, on a database associated with the server, the geographic location of the electronic device, the at least one detail of the data-creating user's personal experience, and the future event notification trigger; and after the steps of receiving and storing, communicating, by the server, at a date indicated by the stored future event notification trigger, to an electronic device of at least one second user indicated by the stored future event notification trigger, the at least one detail of the data-creating user's experience.

2. The computer-implemented method in accordance with claim 1, wherein the step of communicating further includes:

automatically communicating, by the server, at the date indicated by the stored future event notification trigger, to the electronic device of the at least one second user indicated by the stored future event notification trigger, the at least one detail of the data-creating user's personal experience.

3. The computer-implemented method in accordance with claim 1, wherein:

the at least one detail is formed as at least one of a textual description, a photograph, an audio file, and a video file.

4. The computer-implemented method in accordance with claim 1, wherein the step of communicating further includes:

as a result of receiving a geographic location of the electronic device of the at least one second user and determining that the geographic location of the electronic device of the at least one second user is within a preset distance from the stored geographic location of the electronic device of the data-creating user, automatically communicating, by the server, at the date indicated by the stored future event notification trigger, to the electronic device of the at least one second user, the at least one detail of the data-creating user's experience.

5. The computer-implemented method in accordance with claim 1, wherein the date indicated by the stored future event notification trigger is associated with at least one of a birthday and an anniversary.

6. The computer-implemented method in accordance with claim 1, wherein the at least one second user includes a plurality of users, each with remote access, via their respective electronic devices, to the server and the database associated with the server.

* * * * *